(12) United States Patent
Akiyama et al.

(10) Patent No.: US 11,338,259 B2
(45) Date of Patent: May 24, 2022

(54) VESSEL RACK, AGITATOR, AND FINE PARTICLE MEASUREMENT APPARATUS

(71) Applicant: SONY CORPORATION, Tokyo (JP)

(72) Inventors: Shoji Akiyama, Kanagawa (JP); Takeshi Yamasaki, Kanagawa (JP); Shinichi Hasegawa, Chiba (JP); Makoto Sato, Chiba (JP)

(73) Assignee: SONY CORPORATION, Tokyo (JP)

( * ) Notice: Subject to any disclaimer, the term of this patent is extended or adjusted under 35 U.S.C. 154(b) by 364 days.

(21) Appl. No.: 16/081,552

(22) PCT Filed: Dec. 2, 2016

(86) PCT No.: PCT/JP2016/085848
§ 371 (c)(1),
(2) Date: Aug. 31, 2018

(87) PCT Pub. No.: WO2017/158947
PCT Pub. Date: Sep. 21, 2017

(65) Prior Publication Data
US 2019/0070573 A1    Mar. 7, 2019

(30) Foreign Application Priority Data

Mar. 14, 2016 (JP) .............................. JP2016-049917

(51) Int. Cl.
*B01F 11/00* (2006.01)
*B01L 9/06* (2006.01)
(Continued)

(52) U.S. Cl.
CPC ............ *B01F 31/201* (2022.01); *B01F 31/60* (2022.01); *B01L 9/06* (2013.01); *G01N 1/38* (2013.01);
(Continued)

(58) Field of Classification Search
CPC . B01L 9/06; B01L 2300/0851; B01F 11/0008
See application file for complete search history.

(56) References Cited

U.S. PATENT DOCUMENTS

2008/0237115 A1* 10/2008 Shintani ................ B04B 5/0414
                                                      210/304
2010/0264090 A1    10/2010 Ellis et al.
(Continued)

FOREIGN PATENT DOCUMENTS

CN         101678362 A      3/2010
CN         103424351 A     12/2013
(Continued)

OTHER PUBLICATIONS

Machine Translation of JPS4973490-U, published Jun. 26, 1974. Translation retrieved Aug. 2021 (Year: 1974).*

(Continued)

*Primary Examiner* — Elizabeth Insler
(74) *Attorney, Agent, or Firm* — Chip Law Group (57) ABSTRACT

The present technology provides a technology that liquid in round-bottom vessels is efficiently agitated. There is provided a vessel rack at least including a holder having a plurality of through-holes into which round-bottom vessels each having a closed-bottom tube shape are inserted, and a support having a plurality of supporting holes that are arranged facing to the through-holes and support bottoms of the round-bottom vessels, the bottoms of the supporting holes each having a bulge such that liquid in the round-bottom vessels forms a vortex at a time of agitation of the liquid. Also, there is provided an agitator of agitating liquid in round-bottom vessels at least including the vessel rack, a mounting unit that mounts the vessel rack, and a rocking unit that rocks the mounting unit, and the like.

13 Claims, 8 Drawing Sheets

(51) Int. Cl.
  *G01N 1/38* (2006.01)
  *G01N 35/02* (2006.01)
  *B01F 31/20* (2022.01)
  *G01N 15/14* (2006.01)
  *B01F 31/60* (2022.01)
  *G01N 15/00* (2006.01)
  *G01N 15/10* (2006.01)
  *G01N 35/00* (2006.01)
  *B01F 31/44* (2022.01)

(52) U.S. Cl.
  CPC ......... *G01N 15/1459* (2013.01); *G01N 35/02* (2013.01); *B01F 31/44* (2022.01); *B01L 2300/0851* (2013.01); *B01L 2300/0861* (2013.01); *G01N 2015/0053* (2013.01); *G01N 2015/1006* (2013.01); *G01N 2035/00524* (2013.01)

(56) References Cited

U.S. PATENT DOCUMENTS

| | | | |
|---|---|---|---|
| 2013/0309763 A1 | 11/2013 | Hashimoto et al. | |
| 2014/0064019 A1* | 3/2014 | Hamada | B01F 11/0017 366/213 |

FOREIGN PATENT DOCUMENTS

| | | | |
|---|---|---|---|
| JP | 49-073490 U | | 6/1974 |
| JP | 49-73490 U | | 6/1974 |
| JP | S4973490 U | * | 6/1974 |
| JP | 61-175239 U | | 10/1986 |
| JP | 63-115431 U | | 7/1988 |
| JP | 63115431 U | * | 7/1988 |
| JP | 2005-049224 A | | 2/2005 |
| JP | 2010-527782 A | | 8/2010 |
| JP | 2012-132755 A | | 7/2012 |
| JP | 2012-132775 A | | 7/2012 |
| JP | 2012-139608 A | | 7/2012 |
| JP | 2013-238574 A | | 11/2013 |
| JP | 2013-242156 A | | 12/2013 |
| JP | 2014-002107 A | | 1/2014 |
| WO | 2008/145712 A1 | | 12/2008 |

OTHER PUBLICATIONS

International Search Report and Written Opinion of PCT Application No. PCT/JP2016/085848, dated Feb. 21, 2017, 09 pages of ISRWO.

* cited by examiner

VESSEL RACK, AGITATOR, AND FINE PARTICLE MEASUREMENT APPARATUS

CROSS REFERENCE TO RELATED APPLICATIONS

This application is a U.S. National Phase of International Patent Application No. PCT/JP2016/085848 filed on Dec. 2, 2016, which claims priority benefit of Japanese Patent Application No. JP 2016-049917 filed in the Japan Patent Office on Mar. 14, 2016. Each of the above-referenced applications is hereby incorporated herein by reference in its entirety.

TECHNICAL FIELD

The present technology relates to a vessel rack, more particularly to a vessel rack used for liquid agitation in round-bottom vessels, an agitator including the vessel rack, and a fine particle measurement apparatus.

BACKGROUND ART

In recent years, along with progress of an analysis technique, a technique is developed to flow biological fine particles such as cells and microorganisms, fine particles such as microbeads, or the like in a flow path, to individually measure the fine particles, and to analyze or dispense the measured fine particles.

Among typical techniques of analyzing or dispensing fine particles, the analysis technique, which is called as a flow cytometry, is rapidly technically improved. The flow cytometry is the technique of analyzing or dispensing fine particles by flowing fine particles to be analyzed in the state of aligning the fine particles in a fluid, irradiating the fine particles with laser light or the like, and detecting fluorescence or scattered light emitted from the respective fine particles.

In the related art, in the above-described analysis technique, after liquid containing fine particles to be analyzed is agitated, measurement is performed. In this case, after an operator oneself agitates solution in round-bottom vessels such as test tubes using a device such as a vortex mixer for each vessel and sets the plurality of vessels on a rack after agitation, measurement is started. As the device, for example, there is known an agitation mechanism that agitates solution in a reaction vessels each having a closed-bottom tube shape as disclosed in Patent Literature 1.

CITATION LIST

Patent Literature

Patent Literature 1: Japanese Patent Application Laid-open No. 2014-2107

DISCLOSURE OF INVENTION

Technical Problem

However, in the above-described agitation method, in a case where a plurality of vessels are set for measurement, it is necessary to agitate every vessel of all vessels. For an operator, significantly complex operations are needed. In addition, in a case where it needs a long time to measure, fine particles to be analyzed in liquid are precipitated, which may undesirably affect an analysis result.

The present technology is made in view of the above-mentioned circumstances, and it is an object of the present technology to provide a technology that liquid in round-bottom vessels is efficiently agitated.

Solution to Problem

As a result of intensive studies in order to solve the above-described object, the present inventors have been succeeded in efficiently agitating liquid in round-bottom vessels by focusing on a structure of a vessel rack used for agitating liquid in the round-bottom vessels and forming the vessel rack with a specific structure, and have completed the present technology.

Specifically, the present technology provides a vessel rack, at least including: a holder having a plurality of through-holes into which round-bottom vessels each having a closed-bottom tube shape are inserted; and a support having a plurality of supporting holes that are arranged facing to the through-holes and support bottoms of the round-bottom vessels, the bottoms of the supporting holes each having a bulge such that liquid in the round-bottom vessels forms a vortex at a time of agitation of the liquid.

According to the present technology, a diameter of each of the through-holes may be greater than a diameter of each of the supporting holes.

According to the present technology, the bottoms of the supporting holes each may have any of a cone shape, a substantially semispherical shape, and a cylindrical shape.

According to the present technology, a height of the bulge may be 0.02 mm or less.

According to the present technology, the holder and/or the support may be formed of resin. In this case, the resin is not especially limited, but the resin may be polyacetal resin or polyphenylene sulfide resin.

According to the present technology, at least one supporting hole of the supporting holes positioned at corners of the support may be communicated with outside on a part of a side wall of the supporting hole.

The present technology provides an agitator of agitating liquid in a round-bottom vessel, at least including: a vessel rack, at least including a holder having a plurality of through-holes into which round-bottom vessels each having a closed-bottom tube shape are inserted, and a support having a plurality of supporting holes that are arranged facing to the through-holes and support bottoms of the round-bottom vessels, the bottoms of the supporting holes each having a bulge such that liquid in the round-bottom vessels forms a vortex at a time of agitation of the liquid; a mounting unit that mounts the vessel rack; and a rocking unit that rocks the mounting unit.

According to the present technology, the rocking unit may at least include a first moving mechanism that moves the mounting unit in one predetermined axis direction, and a second moving mechanism that moves the mounting unit in a direction perpendicular to the one predetermined axis direction. In this case, the second moving mechanism may be attached to the first moving mechanism.

The present technology provides a fine particle measurement apparatus, at least including: an agitator of agitating liquid in a round-bottom vessel, at least including a vessel rack, at least including a holder having a plurality of through-holes into which round-bottom vessels each having a closed-bottom tube shape are inserted, and a support having a plurality of supporting holes that are arranged facing to the through-holes and support bottoms of the round-bottom vessels, the bottoms of the supporting holes each having a bulge such that liquid in the round-bottom vessels forms a vortex at a time of agitation of the liquid, a mounting unit that mounts the vessel rack, and a rocking unit that rocks the mounting unit; and a detector that detects light generated from fine particles to be analyzed.

According to the present technology, the rocking unit may at least include a first moving mechanism that moves the mounting unit in one predetermined axis direction, and a second moving mechanism that moves the mounting unit in a direction perpendicular to the one predetermined axis direction. In this case, the second moving mechanism may be attached to the first moving mechanism.

The fine particle measurement apparatus according to the present technology may further include a sampler that automatically samples the liquid in the round-bottom vessel. In this case, the mounting unit may be moved to a predetermined position at a time of sampling by the sampler.

In the present technology, the "fine particles" widely include bio-related fine particles such as cells, microorganisms, and liposomes, synthetic particles such as latex particles, gel particles, and industrial particles, and the like.

The bio-related fine particles include chromosomes, liposomes, mitochondria, organelles, and the like that form a variety of cells. The cells include animal cells (for example, hematopoietic cells) and vegetable cells. The microorganisms include bacteria such as *E. coli*, viruses such as tobacco mosaic virus, fungus such as yeast fungus, and the like. Furthermore, the bio-related fine particles may include bio-related polymers such as nucleic acids, proteins, and their complexes. In addition, the industrial particles may be, for example, organic or inorganic polymer materials, metal, and the like. The organic polymer material includes polystyrene, styrene-divinylbenzene, polymethyl methacrylate, and the like. The inorganic polymer material includes glass, silica, a magnetic material, and the like. The metal includes a gold colloid, aluminum, and the like. The shapes of the fine particles are typically spherical, but may be nonspherical according to the present technology. The size, the weight, or the like of the fine particles is not especially limited.

Advantageous Effects of Invention

According to the present technology, liquid in round-bottom vessels can be efficiently agitated. It should be noted that the effects described here are not necessarily limitative and may be any of effects described in the present disclosure.

MODE(S) FOR CARRYING OUT THE INVENTION

Hereinafter, preferable embodiments of the present technology will be described with reference to the drawings. The embodiments described below illustrate typical embodiments of the present technology and are not limit the scope of the present technology. Note that the embodiments of the present technology will be described in the following order.
1. Vessel rack 1
(1) Holder 11
(2) Support 12
2. Agitator 2
(1) Mounting unit 21
(2) Locking unit 22
[Specific example of rocking apparatus 3]
3. Fine particle measurement apparatus 3
(1) Detector 31
(2) Sampler 32
(3) Information processing apparatus 33
(4) Light irradiator 34
(5) Dispenser 35
(6) Memory 36
(7) Flow path P
(8) Display 37
(9) User interface 38
(10) Others
[Specific example of measurement using fine particle measurement apparatus 3]
 1. Vessel Rack 1

Figure 1:
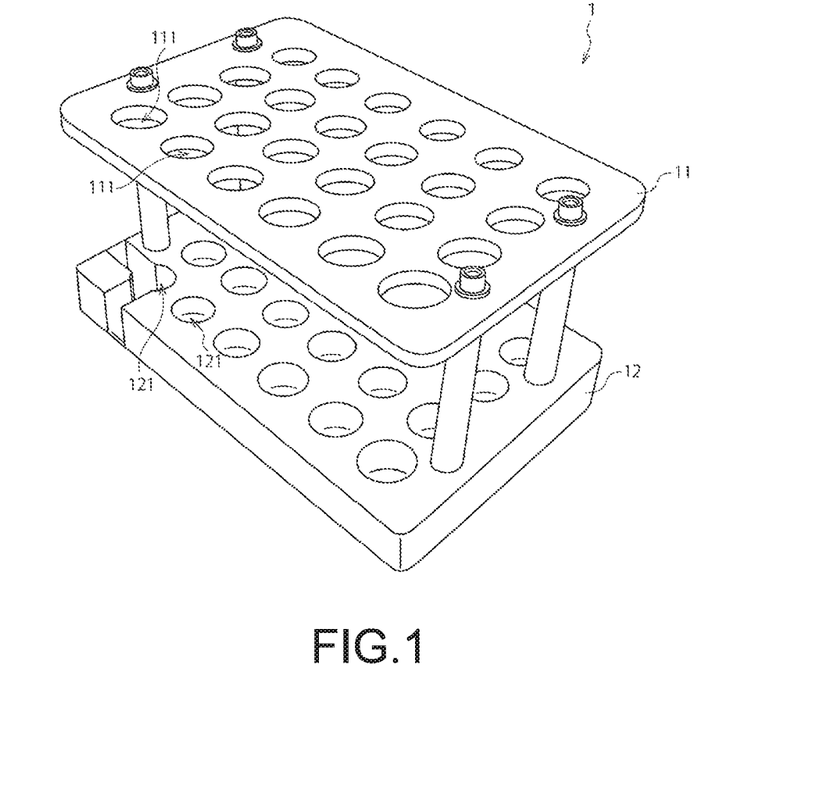
FIG. 1 is a perspective view showing a first embodiment of a vessel rack 1 according to the present technology.
Figure 2:
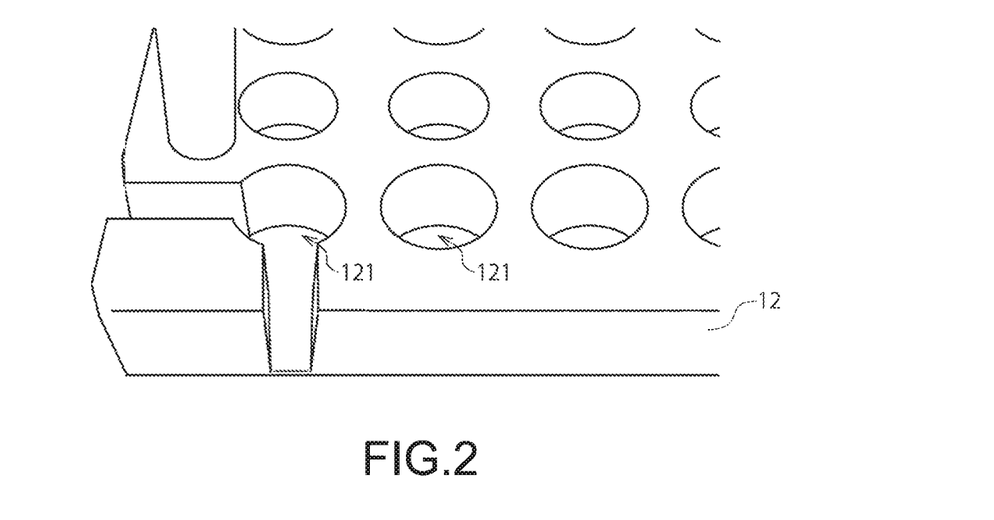
FIG. 2 is a partially enlarged view of the first embodiment of the vessel rack 1 according to the present technology.

FIG. 1 is a perspective view showing an embodiment of a vessel rack 1 according to the present technology and FIG. 2 is a partially enlarged view of the embodiment shown in FIG. 1. The vessel rack 1 according to the present technology at least includes a holder 11 and a support 12. In addition, other units may be included, as necessary. Hereinafter, each unit will be described in detail.

(1) Holder 11

Figure 3A:
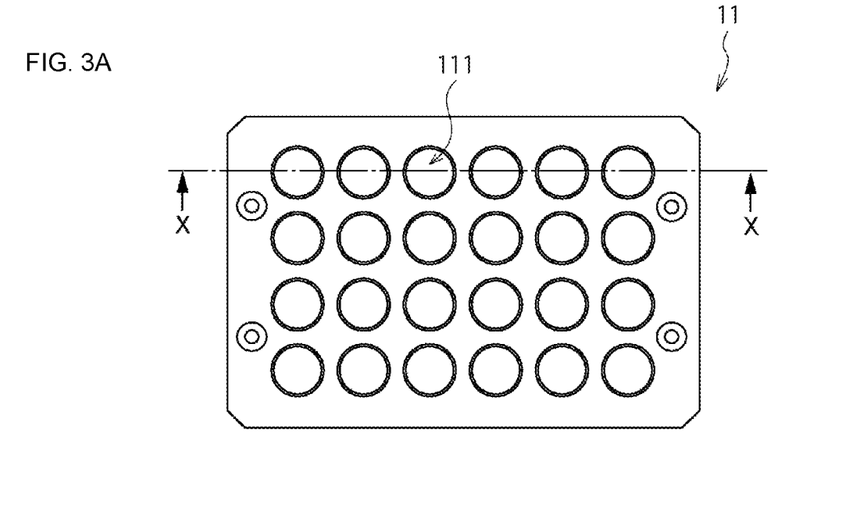
FIG. 3A is a top view of a holder 11 of the first embodiment.
Figure 3B:
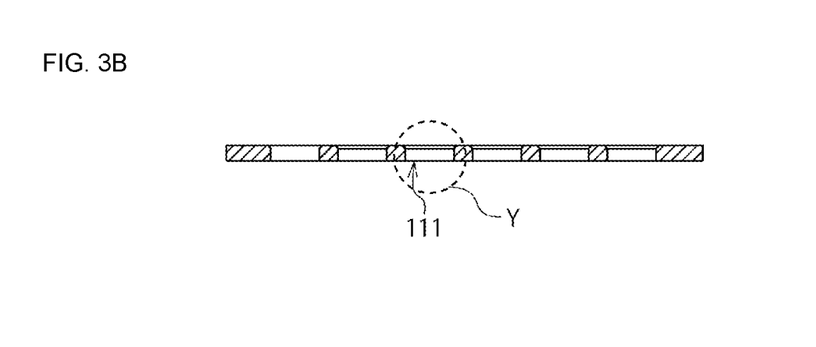
FIG. 3B is a cross-sectional view taken along the line X-X of FIG. 3A.
Figure 4:
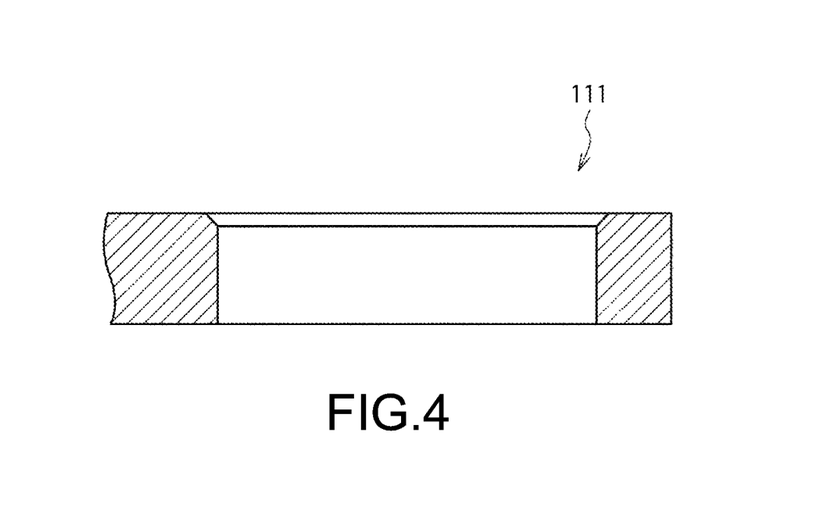
FIG. 4 is an enlarged view of a part Y shown in FIG. 3B.

FIG. 3A is a top view of the holder 11 of a first embodiment and FIG. 3B is a cross-sectional view taken along the line X-X of FIG. 3A. In addition, FIG. 4 is an enlarged view of the part Y shown in FIG. 3B. The holder 11 has a plurality of through-holes 111 into which round-bottom vessels each having a closed-bottom tube shape are inserted.

In the present technology, the round-bottom vessel having a closed-bottom tube shape is not especially limited, but may be a variety of experimental tools such as a test tube, a round-bottom flask, and a tube, for example. Also, the material of forming the vessel is not especially limited, but may be polypropylene (PP) or polystyrene (PS), for example. Furthermore, the volume of the vessel is not especially limited.

In the present technology, the shape of the whole through hole 111 is not especially limited. In a case where the round-bottom vessel is a test tube or a tube, the shape of the through hole 111 is preferably a substantially cylindrical shape. In addition, the number of the through holes 111 formed in the holder 11 is not especially limited as long as at least two or more through holes 111 are formed.

The material forming the holder 11 is not especially limited, but may be metal such as aluminum, resin, or the like. In the present technology, the material of the holder 11 is preferably resin, i.e., polyacetal resin (ROM) or polyphenylene sulfide resin (PPS) and especially preferably polyacetal resin as described later in Examples and for the reasons described above.

It is generally known that if the vessel rack 1 is rotated clockwise, for example, the round-bottom vessels arranged in the vessel rack 1 rotate counterclockwise. A rotating speed of the vessels depends on friction with the vessel rack 1. Specifically, a rocking speed of the vessel rack 1 does not equal to the rotating speed of the vessels, and a frictional force greatly affect thereon at the time of a rock of the vessel rack 1. Accordingly, it is desirable that the frictional force less affects thereon during the rotation of the round-bottom vessels. The polyacetal resin has a friction coefficient smaller than that of the polyphenylene sulfide resin. Thus, the polyacetal resin is an especially preferable material in the present technology.

Furthermore, in the first embodiment shown in FIG. 4, the through hole 111 has a straight hole shape. In the present technology, a through hole 111 having a tapered end shape may be used.

(2) Support 12

Figure 5A:
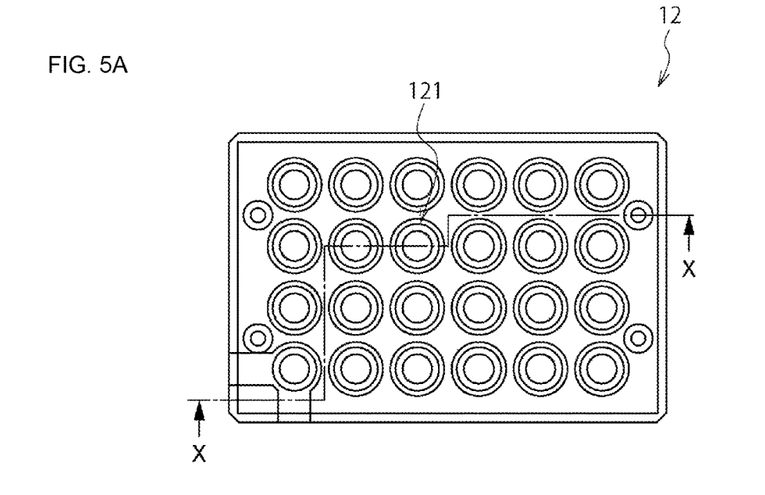
FIG. 5A is a top view of a support 12 in the first embodiment.
Figure 5B:
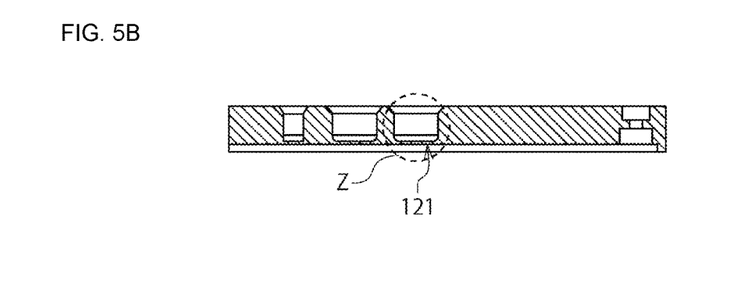
FIG. 5B is a cross-sectional view taken along the line X-X of FIG. 5A.
Figure 6:
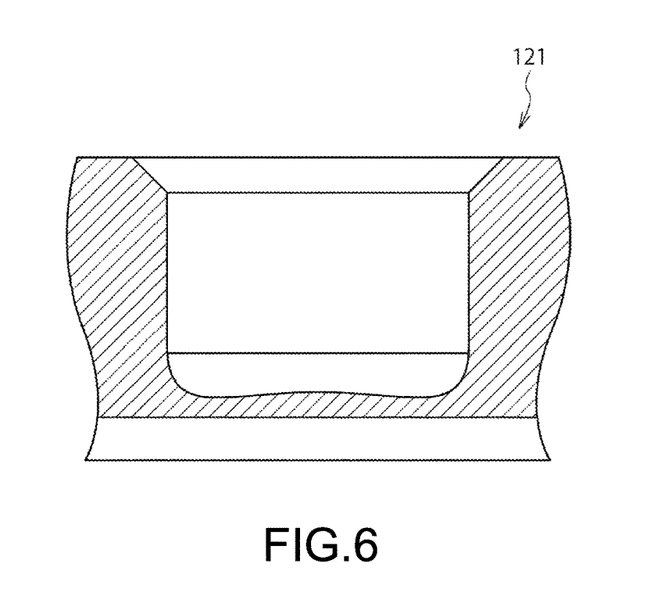
FIG. 6 is an enlarged view of a part Z shown in FIG. 5B.

FIG. 5A is a top view of the support 12 in the first embodiment and FIG. 5B is a cross-sectional view taken along the line X-X of FIG. 5A. In addition, FIG. 6 is an enlarged view of the part Z shown in FIG. 5B. As shown in FIG. 1 and the like, the support 12 is arranged facing to the through holes 111 and includes a plurality of support holes 121 that support bottoms of the round-bottom vessels.

As shown in FIG. 1, in the present technology, the number of the through holes 111 and the number of the support holes 121 may be preferably the same. In addition, in the present technology, the above-described holder 11 may be partially connected to the support 12 using columnar members (rack shafts) or the like, as shown in FIG. 1.

In the present technology, the bottoms of the supporting holes each has a bulge such that liquid in the round-bottom vessels forms a vortex at a time of agitation of the liquid.

In general, in the state that the rocking speed is slow and no vortex is generated, it cannot be said that the liquid in the vessels are satisfactorily agitated. In the vessel rack of the related art, the bottoms of the support holes are flat. If the whole vessel rack is tried to be rocked and agitated, each center of the bottoms of the round-bottom vessels approaches each center of the bottoms of the support holes. Each round-bottom vessel itself temporarily stands up. Under the state, the liquid in the vessels is not agitated. In particular in the case where the liquid in the plurality of the round-bottom vessels is agitated at the same time, the liquid in the vessels cannot be efficiently agitated in the vessel rack of the related art.

On the other hand, in the present technology, the bottoms of the supporting holes 121 each has a bulge such that the liquid in the round-bottom vessels forms a vortex at the time of agitation of the liquid. It is thus possible to prevent each center of the bottoms of the round-bottom vessels from approaching each center of the bottoms of the support holes 121 and to prevent the round-bottom vessel itself from temporarily standing up during agitation. Thus, in a case where the round-bottom vessels are agitated, the liquid in the vessels can be effectively agitated. In particular, since the plurality of round-bottom vessels can be efficiently agitated at the same time, burden of the operator is decreased and experimental steps can be simplified.

In the present technology, the liquid in the round-bottom vessels is not especially limited, but may be any liquid including fine particles, for example. In this case, by using the vessel rack 1 according to the present technology, an agitation operation can be efficiently performed. It is thus possible to prevent the fine particles from precipitating on parts of the vessels. In a case where a flow cytometer is used for measurement, a measurement accuracy can be improved.

In the present technology, as shown in FIG. 2, at least one supporting hole of the supporting holes 111 positioned at the corners of the support 11 may be communicated with outside on a part of a side wall of the supporting hole. With this structure, when the round-bottom vessels are arranged in the vessel rack 1, the operator can visually recognize the bottoms of the round-bottom vessels. Thus, the state of the round-bottom vessels can be observed and an agitation level of the liquid in the round-bottom vessels can be recognized.

In the present technology, a diameter of the through-hole 111 may be greater than a diameter of the supporting hole 121. With this structure, as shown in Examples described later, the liquid in the plurality of vessels can be efficiently agitated.

In the present technology, the shape of the bottom of the supporting hole 121 is not especially limited, but may be preferably any of a cone shape, a substantially semispherical shape, and a cylindrical shape, especially preferably the cone shape. With this structure, solution in the plurality of vessels can be more efficiently agitated. Also, manufacturing process of the vessel rack 1 can be simplified.

In the present technology, the height of the bulge is not especially limited, but is preferably 0.02 mm or less. With this structure, in a fine particle measurement apparatus 3 having a sampler 32, for example, a remaining quantity of the liquid in each sample tube can be fixed at the time of sampling and a table common to well plates can be used. Thus, usability can be improved.

In the present technology, the shape of the whole through hole 111 is not especially limited. In a case where the round-bottom vessel is a test tube or a tube, the shape of the through hole 111 is preferably a substantially cylindrical shape. In addition, the number of the support holes 121 formed in the support 12 is not especially limited as long as at least two or more support holes 121 are formed.

The material forming the support 12 is not especially limited, but may be metal such as aluminum, resin, or the like. In the present technology, the material of the holder 11 is preferably resin, i.e., polyacetal resin (ROM) or polyphenylene sulfide resin (PPS) and especially preferably polyacetal resin as described later in Examples and for the reasons described above.

Furthermore, in the first embodiment shown in FIG. 6, the support hole 121 has a straight hole shape. In the present technology, a support hole 121 having a tapered end shape may be used.

2. Agitator

Figure 7:
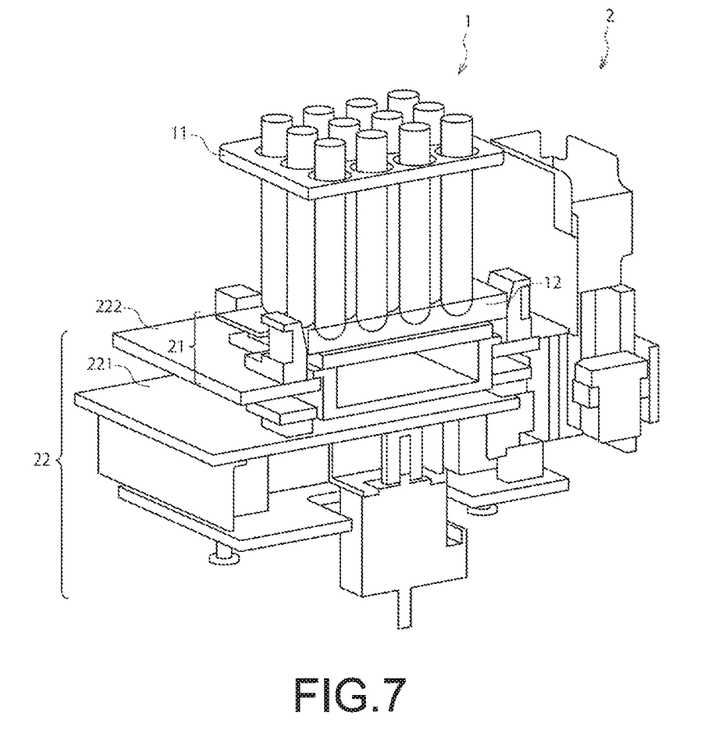
FIG. 7 is a perspective view showing a first embodiment of an agitator 2 according to the present technology.

FIG. 7 is a perspective view showing a first embodiment of an agitator 2 according to the present technology and FIG.

8 is a perspective view showing the embodiment of the agitator 2 according to the present technology viewed from an angle different from that of FIG. 7. The agitator 2 according to the present invention at least includes the vessel rack 1, mounting units 21, and a rocking unit 22. In addition, the agitator 2 may include other units as necessary. Hereinafter, each unit will be described in detail. Note that as the vessel rack 1 is similar to that described above, the description is omitted here. Furthermore, in FIGS. 7 and 8, the round-bottom vessels each having a closed-bottom tube shape are described for convenience. In the present technology, the round-bottom vessels are not essential.

(1) Mounting Unit 21

The mounting units 21 are units to which the vessel rack 1 is mounted. In the present technology, the shape, the structure, or the like of each mounting unit 21 is not especially limited as long as the vessel rack 1 can be mounted. For example, there is a mechanism that when a clamp arm is pulled forward, a clamp pin is released to allow the vessel rack 1 to be mounted, and when the clamp arm is detached to allow the vessel rack 1 to be fixed by a spring. Furthermore, in a case where the vessel rack 1 has a four-sided shape, for example, two faces of the vessel rack 1 are pushed by the clamp pins and diagonal two sides are received by pins.

In addition, each mounting unit 21 may include a sensor or the like that checks a position of the sampler 32 as described later.

(2) Rocking Unit 22

The rocking unit 22 is a unit of rocking the mounting units 21. In the present technology, the shape, the structure, or the like of the rocking unit 22 is not especially limited, but preferably has a three-layer structure shown in a specific example described below. With this structure, the liquid in the round-bottom vessels can be more efficiently agitated.

In the present technology, the rocking unit 22 may at least include a first moving mechanism 221 that moves each mounting unit 21 in one predetermined axis direction (for example, the Y axis direction) and a second moving mechanism 222 that moves each mounting unit 21 in a direction perpendicular to the one predetermined axis direction (for example, the X axis direction) as shown in FIG. 7. With this structure, the three-layer structure shown in the specific example described below can be formed.

[Specific Example of Rocking Device 3]

Hereinafter, a specific example of a rocking device 3 according to the present technology will be described.

Figure 8:
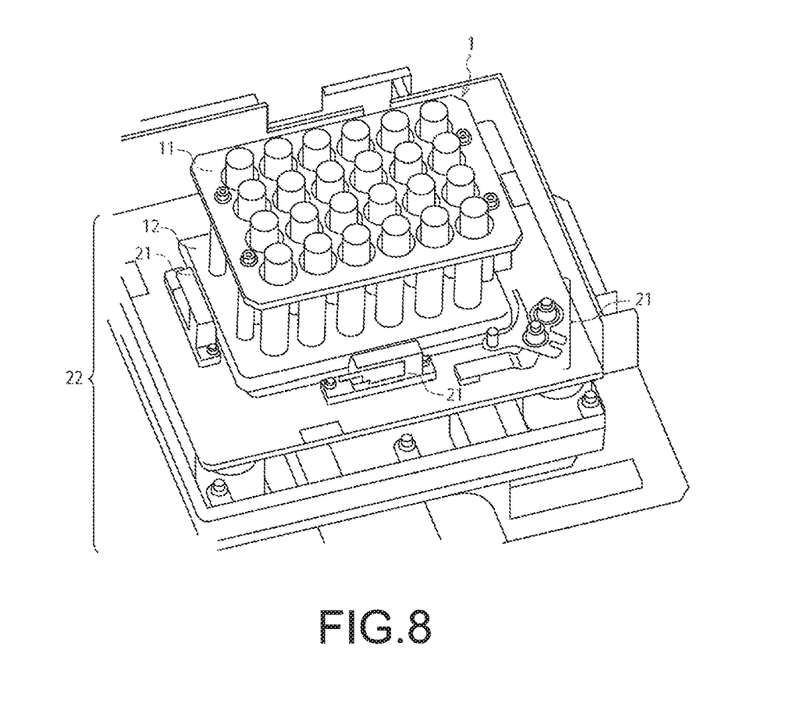
FIG. 8 is a perspective view showing the first embodiment of the agitator 2 according to the present technology viewed from an angle different from that of FIG. 7.

The agitator 3 has the three-layer structure that the whole mounting units 12 to which the vessel rack 1 is mounted are rocked as shown in FIGS. 7 and 8. Specifically, the three-layer structure has a first layer, i.e., a base to which the first moving mechanism is attached, a second layer, i.e., the first moving mechanism attached to the base and movable in the Y axis direction (hereinafter also referred to as a "Y base"), and a third layer, i.e., the second moving mechanism attached to the Y base and movable in the X axis direction (hereinafter also referred to as an "X base"). Thus, the vessel rack 1 is mounted above the X base.

In the three-layer structure, as the second layer, i.e., the Y base moves in the Y axis direction and the third layer, i.e., the X base moves in the X axis direction, a rocking (circular) movement can be performed. Note that rotating eccentric pins (for example, eccentricity of 1 mm) are used and rocking shafts are assembled by attaching bearing housings to the first layer, i.e., the base, such that the rocking movement is carried. Ends of rotating shafts are inserted into bearing components in the third layer, the shafts are rotated, the third layer, i.e., X base is rocked, and the second layer, i.e., the Y base is rocked. Thus, the circular movement is possible.

Also, the rotating shafts are connected via a stepping motor and a timing belt. By rotating the stepping motor, the whole mounting units 21 can be rocked. An agitating speed (rocking speed of mounting units 21) can be optimal by changing numbers of revolution of the stepping motor.

3. Fine Particle Measurement Apparatus 3

Figure 9:
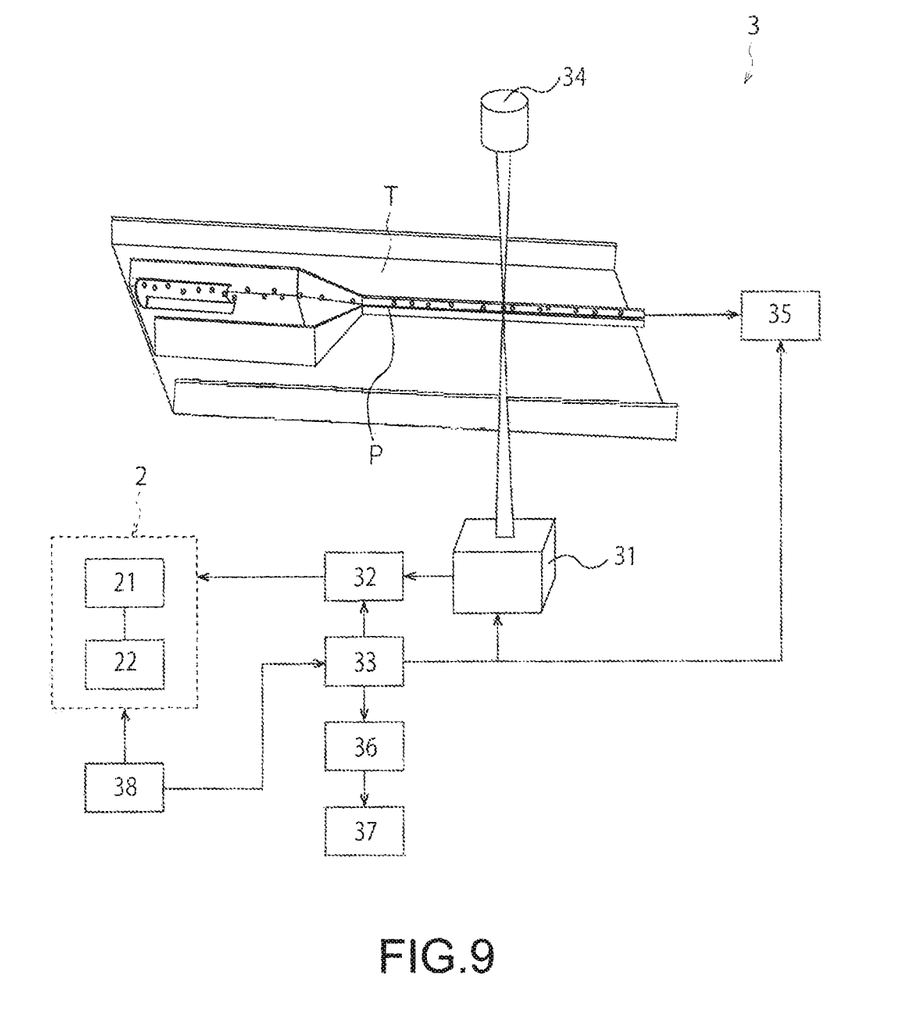
FIG. 9 is a schematic diagram schematically showing a first embodiment of a fine particle measurement apparatus 3 according to the present technology.
Figure 10:
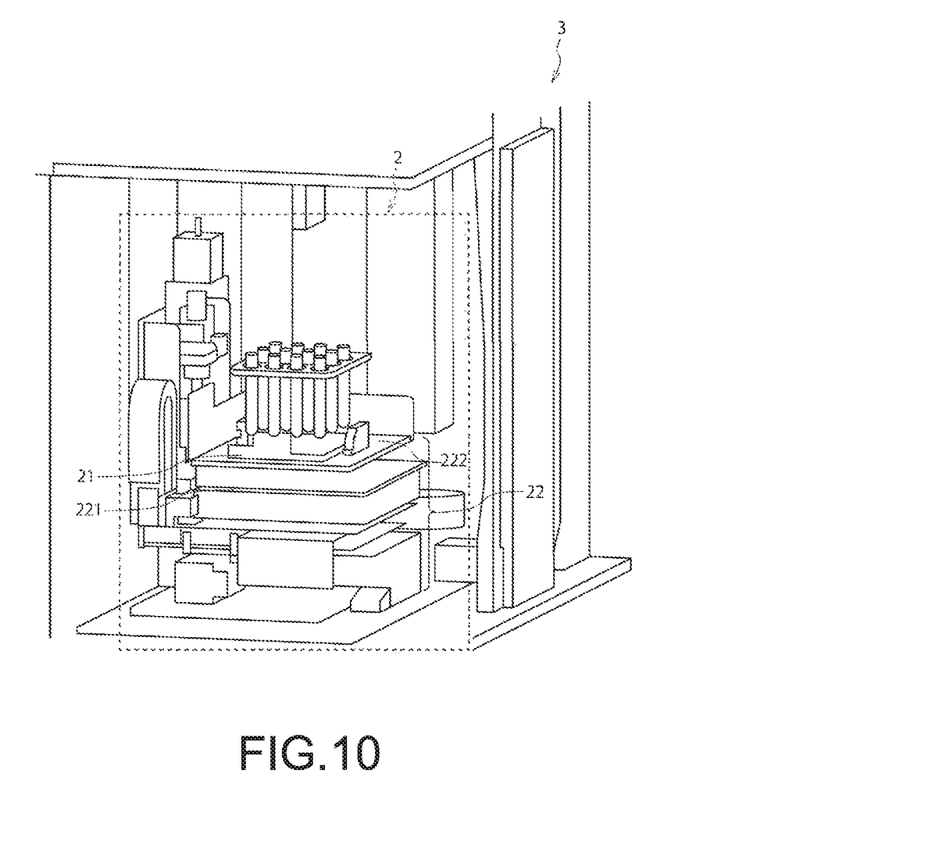
FIG. 10 is a partially enlarged view of the first embodiment of the fine particle measurement apparatus 3 according to the present technology.

FIG. 9 is a schematic diagram schematically showing a first embodiment of a fine particle measurement apparatus 3 according to the present technology and FIG. 10 is a partially enlarged view of the first embodiment of the fine particle measurement apparatus 3 according to the present technology. The fine particle measurement apparatus 3 according to the present technology includes at least the agitator 2 and the detector 31. Also, the fine particle measurement apparatus 3 may include the sampler 32, an information processing apparatus 33, a light irradiator 34, a dispenser 35, a memory 36, a flow path P, a display 37, a user interface 38, and the like, as necessary. Hereinafter, each unit will be described in detail. Note that as the agitator 2 is similar to that described above, the description is omitted here. Furthermore, in FIG. 10, the round-bottom vessels each having a closed-bottom tube shape are described for convenience. In the present technology, the round-bottom vessels are not essential.

(1) Detector 31

The detector 31 detects light from fine particles to be analyzed. The type of the detector 31 is not especially limited as long as light from fine particles can be detected. Any known light detectors can be freely selected and used. For example, one, two, or more of a fluorometry device, a scattered light measurement device, a transmitted light measurement device, a reflected light measurement device, a diffracted light measurement device, a ultraviolet spectrometer, an infrared spectrometer, a Raman spectrometer, a FRET measurement device, a FISH measurement device, other various spectrum measurement devices, a so-called multi-channel light detector in which a plurality of light detectors are arranged in an array, and the like can be used freely in combination.

According to the present technology, the detector 31 may be an area image sensor such as a CCD and a CMOS, a PMT, a photodiode, or the like.

According to the present technology, the detector 31 preferably includes a plurality of light-receiving devices having different detection wavelength regions. Since the detector 31 includes a plurality of light-receiving devices having different detection wavelength regions, light intensity within the continuous wavelength region can be measured as a fluorescence spectrum. Specific examples include a PMT array or a photodiode array in which light-receiving devices are one-dimensionally arranged and those including a plurality of independent detection channels such as two-dimensional light-receiving devices, e.g., CCD, CMOS, or the like.

Figure 11:
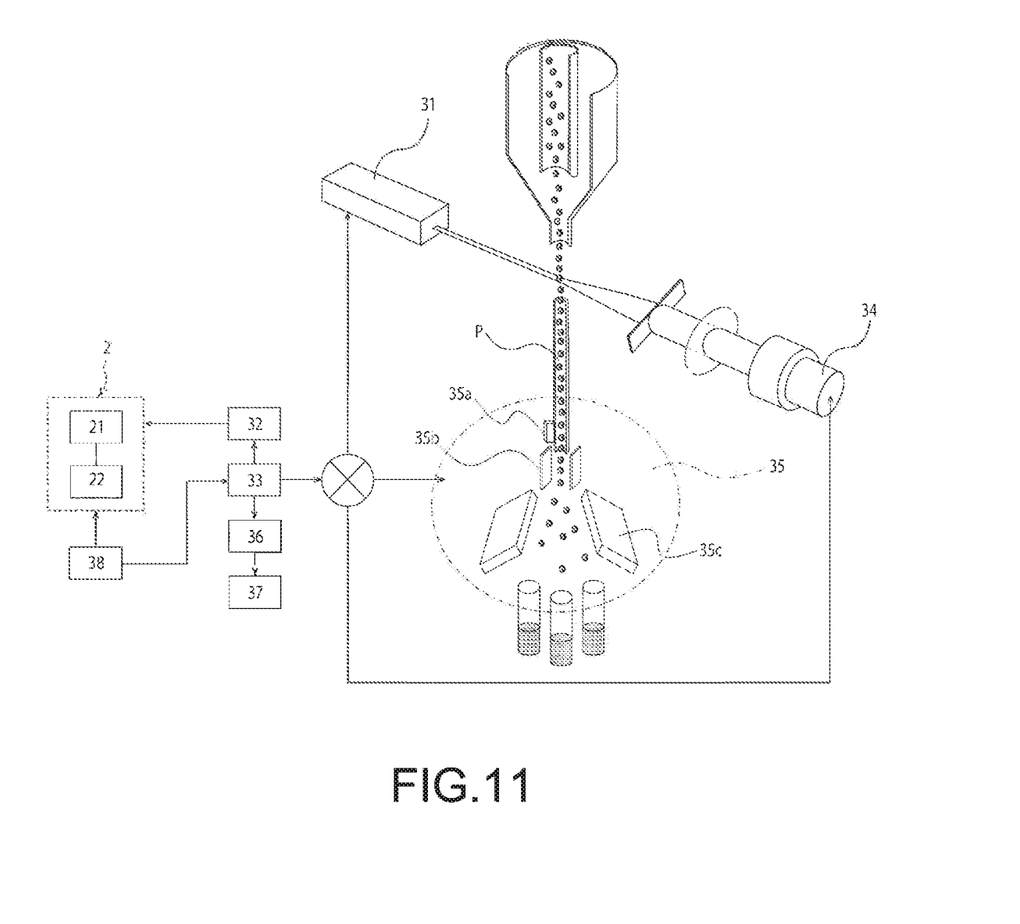
FIG. 11 is a schematic diagram schematically showing a second embodiment of a fine particle measurement apparatus 3 according to the present technology.

The location of the detector 31 of the fine particle measurement apparatus 3 is not especially limited as long as light from the fine particles to be analyzed can be detected, and can be freely designed. For example, as shown in FIGS. 9 and 11, the detector 31 is preferably located at a side opposite to the light irradiator 34 across the flow path P, as described later. By locating the detector 31 at a side opposite to the light irradiator 34 across the flow path P, the detector 31 and the light irradiator 34 can be located in a more free arrangement. In addition, as fluorescence is also emitted in a direction different from an incident direction of irradiated light, for example, the detector 31 may be located at the same side of the light irradiator 34 or at the side at an angle of 90 degrees of the light irradiator 34 relative to the flow path P.

(2) Sampler 32

The fine particle measurement apparatus 3 according to the present technology may further include the sampler 32. The sampler 32 automatically samples the liquid in the round-bottom vessels by using a nozzle or the like included in the sampler 32. Since the fine particle measurement apparatus 3 according to the present technology includes the sampler 32, it does not need to perform sampling by the operator oneself. The burden of the operator is decreased and experimental steps can be simplified.

In the present technology, the sampler 32 can be moved, for example, in the X axis, Y axis, and Z axis directions. This allows to efficiently perform the sampling.

In the present technology, at the time of the sampling by the sampler 32, the mounting units 21 of the agitator 2 are preferably moved to the predetermined position (for example, at a position upper than the position where the agitator 2 agitates). This allows to efficiently perform the sampling by the sampler 32.

(3) Information Processor 33

The fine particle measurement apparatus 3 according to the present technology may further include an information processor 33. The information processor 33 performs information processing and control of the detector 31, the sampler 32, the light irradiator 34, a dispenser 35, the memory 36, the display 37, the user interface 38, and the like.

Note that, in the present technology, the functions performed by the information processing apparatus 33 may be stored in hardware resources including a personal computer, a control unit including a CPU or the like, and a recording medium (non-volatile memory (for example, USB memory or the like), HDD, CD, or the like) as a program and may be fulfilled by the personal computer or the control unit.

(4) Light Irradiator 34

The fine particle measurement apparatus 3 according to the present technology may further include the light irradiator 34 that irradiates fine particles with light. The type of light irradiated from the light irradiator 34 is not especially limited. In order to reliably generate fluorescence or scattered light from particles, the light having a fixed light direction, a fixed wavelength, and a fixed light intensity is preferable. Specific examples include a laser, an LED, and the like. In a case where laser is used, the type is not especially limited, but one, two, or more of an argon ion (Ar) laser, a helium-neon (He—Ne) laser, a dye laser, a krypton (Cr) laser, semiconductor laser, or a solid-state laser by combining a wavelength conversion optical element with a semiconductor laser can be freely used in combination.

(5) Dispenser 35

The fine particle measurement apparatus 3 according to the present technology may further include the dispenser 35 that dispenses fine particles. More specifically, for example, the dispenser 35 dispenses fine particles on a basis of spectral data generated by correcting the value, which is detected by the detector 31, by the information processor 33. The dispenser 35 can dispense fine particles at downstream of the flow path P on the basis of analysis results of sizes, morphology, internal structures of the fine particles analyzed from the spectral data.

Specifically, liquid droplets are generated from a discharge port of the flow path P by oscillating the whole or a part of the flow path P using an oscillator 35a or the like that oscillates at the predetermined number of oscillation, for example, as shown in FIG. 11. Note that, in this case, the oscillator 35a used is not especially limited, but any known oscillators can be freely selected and used. Examples include a piezo oscillator and the like. In addition, by adjusting a liquid amount fed to the flow path P, the diameter of the discharge port, the number of oscillation of the oscillator, and the like, the size of the liquid droplets is adjusted to generate the liquid droplets including a fixed amount of the fine particles.

Next, plus or minus electric charges are charged on the basis of the analysis results of sizes, morphology, internal structures of the fine particles analyzed from the spectral data generated by the correction by the information processor 33 (see sign 35b of FIG. 11). Then, a counter electrode 34c to which a voltage is applied changes courses of the charged liquid droplets in a desirable direction and the fine particles therein are dispensed.

(6) Memory 36

The fine particle measurement apparatus 3 according to the present technology may further include the memory 36. The memory 36 stores all items about the measurement including the values detected by the detector 31, the spectral data generated by the information processor 33, a reference spectrum for each channel, and the like.

The memory 36 is not essential in the fine particle measurement apparatus 3 and an external memory unit may be connected. As the memory 36, a hard disk or the like can be used, for example.

(7) Flow Path P

The fine particle measurement apparatus 3 according to the present technology may further include the flow path P. In the fine particle measurement apparatus 3 according to the present technology, optical information acquired from fine particles aligned in a row within a flow cell (flow path P) is detected to analyze and dispense the fine particles.

The fine particle measurement apparatus 3 may include the flow path P in advance. Alternatively, a commercially available flow path P, a disposable chip including the flow path P, or the like may be disposed on the fine particle measurement apparatus 3 for analysis or dispensing.

The geometry of the flow path P is also not especially limited, but may be freely designed. For example, not only the flow path P formed in a substrate T formed of two-dimensional or three-dimensional plastic or glass shown in FIG. 9 but also the flow path P used in the flow cytometer of the related art shown in FIG. 11 may be used in the fine particle measurement apparatus 3 according to the present technology.

In addition, a flow path width, a flow path depth, a flow path cross-sectional shape of the flow path P are not especially limited, but can be freely designed as long as a laminar flow can be formed. For example, a microflow path having a flow path width of 1 mm or less can be used in the fine particle measurement apparatus 3. In particular, the microflow path having a flow path width of from about 10 μm to about 1 mm can be suitably used in the fine particle measurement apparatus 3 according to the present technology.

(8) Display 37

The fine particle measurement apparatus 3 according to the present technology may further include the display 37. The display 37 can display all items about the measurement including the values detected by the detector 31, the spectral data generated by the information processor 33, the reference spectrum for each channel, and the like.

The display 37 is not essential in the fine particle measurement apparatus 3 and an external display unit may be connected. As the display 37, a display, a printer, or the like can be used, for example.

(9) User Interface 38

The fine particle measurement apparatus 3 according to the present technology may further include the user interface 38. The user interface 38 is a part operated by a user such as an operator. The user can access the information processor 33 through the user interface 38 and control each unit of the fine particle measurement apparatus 3 according to the present technology.

The user interface 38 is not essential in the fine particle measurement apparatus 3 and an external operation unit may be connected. As the user interface 38, a mouse, a keyboard, or the like can be used, for example.

(10) Others

The above-described agitator 2 according to the present technology may include the display 37 and the user interface 38. Also, the agitator 2 can be connected to each unit of the flow cytometer (detector 31, sampler 32, or the like) via a network. Furthermore, the memory 36, the display 37, and the user interface 38 can be provided outside the agitator 2 and connected via a network.

[Specific Example of Measurement Using Fine Particle Measurement Apparatus 3]

Figure 12:
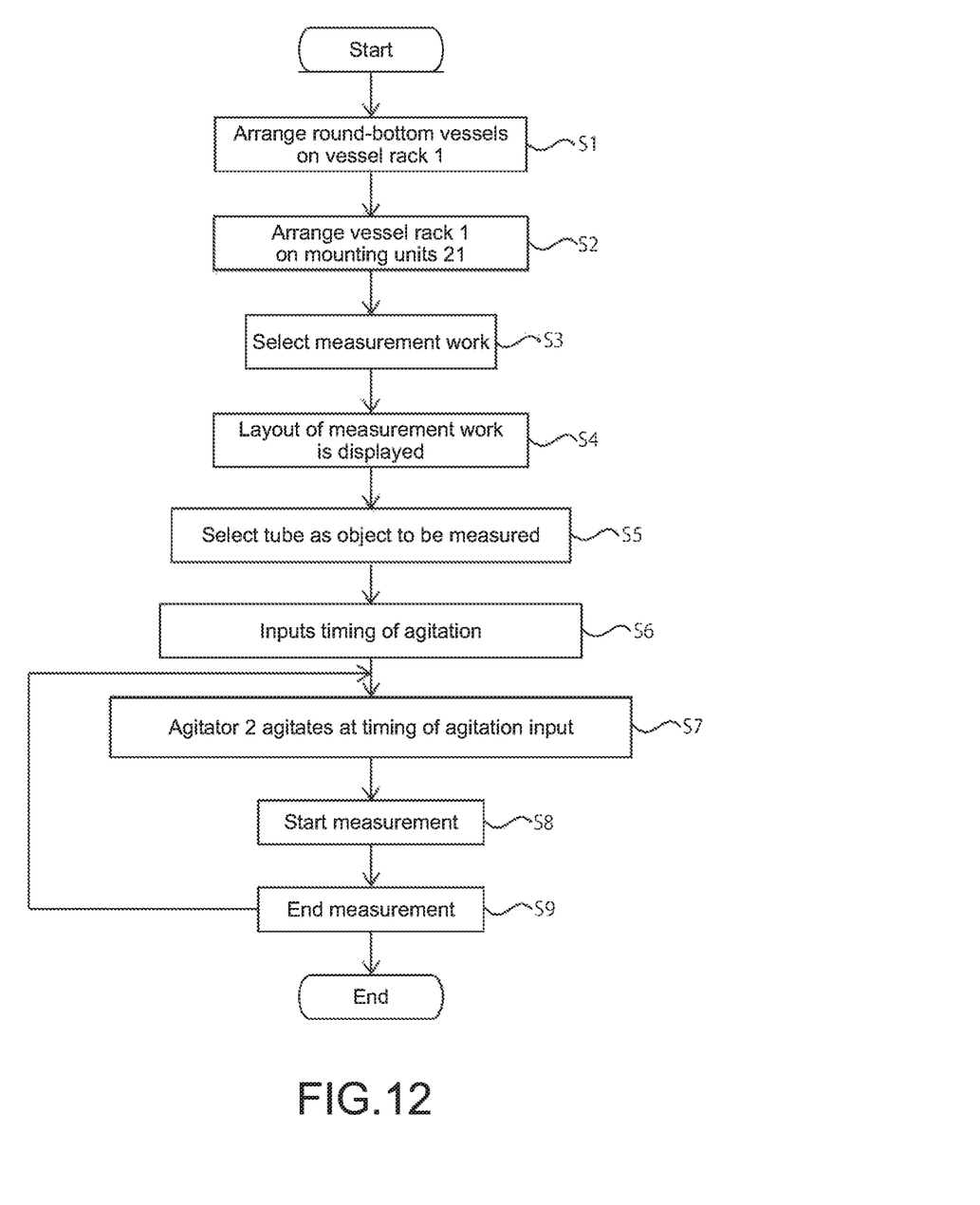
FIG. 12 is a flow diagram showing an example of measurement using the fine particle measurement apparatus 3 according to the present technology.

Hereinafter, a specific example of the rocking apparatus 3 according to the present technology will be described. FIG. 12 is a flow diagram showing an example of measurement using the fine particle measurement apparatus 3 according to the present technology.

First, the operator arranges round-bottom vessels (for example, 1 to 24 5 mL tubes) including liquid containing fine particles or the like on the vessel rack 1 (Step S1). Next, the operator arranges the vessel rack 1 on the mounting units 21 (Step S2). More specifically, in Step S2, for example, the operator releases clamps of locking parts of the rock mounting units 21 by hand and then mounts the vessel rack 1 on the upper position of the above-described X base. The locking parts are fixed, for example, by a spring.

Thereafter, the operator selects a measurement work for 5 mL tube or the like via the user interface 38, for example (Step S3). After that, a layout of the measurement work for 5 mL tube is displayed on the display 37 (Step S4). Then, the operator selects a tube as the object to be measured via the user interface 38 (Step S5). Thereafter, the operator inputs a timing of the agitation via the user interface 38 (Step S6).

Then, at the timing of the agitation input, the agitator 2 agitates (Step S7), and the fine particle measurement apparatus 3 starts the measurement (Step S8). After the measurement is ended (Step S9), Steps S7 to S9 are repeated until the analysis of the liquid in all round-bottom vessels is ended, the agitation is performed under the set agitation conditions, and it repeats that the next measurement is done.

EXAMPLES

Hereinafter, the present technology will be described further in detail with reference to Examples. It should be noted that the embodiments described below illustrate only examples of typical embodiments of the present technology, and the scope of the present technology is not narrowly interpreted by the embodiments.

Test Example 1

In this test example 1, it determined whether or not vortex formation was different in two types of vessel racks, namely each bottom of the support holes being flat or having a bulge. The round-bottom vessels tested were two types of tubes, namely 5 mL tubes formed of polystyrene (PS) and 5 mL tubes formed of polypropylene (PP). In this test example 1, more specifically, the total pulse of agitation was set to 25000 pulses, each vessel rack was rotated clockwise and counterclockwise, and each acceleration pulse (pulse), a frequency (Hz), an acceleration time (seconds), and a rotation number (rpm) were determined, and the vortex formation was visually confirmed. In this text example 1, in a case where it confirmed that the vortex was formed in clockwise and counterclockwise rotation, it was evaluated as "good". Otherwise, it was evaluated as "bad".

Note that, in this test example 1, the bulge of the bottom of the support hole had a cone shape and had a height of 0.02 mm. In addition, any vessel rack included the holder and the support, both of which are formed of polyphenylene sulfide resin (PPS). In addition, any vessel rack had a through hole diameter of 14 mm and a support hole diameter of 13 mm.

TABLE 1

| Acceleration pulse (pulse) | Frequency (Hz) | Acceleration time (sec) | Rotation number (rpm) | Evaluation Tube made of PS | | Tube made of PP | |
| --- | --- | --- | --- | --- | --- | --- | --- |
| | | | | Flat bottom | Bulge | Flat bottom | Bulge |
| 1800 | 5870 | 0.57 | 1761 | Bad | Bad | Bad | Bad |
| 1850 | 5950 | 0.57 | 1785 | Bad | Bad | Bad | Bad |
| 1900 | 6029 | 0.58 | 1809 | Bad | Bad | Bad | Good |
| 1950 | 6108 | 0.59 | 1832 | Bad | Bad | Bad | Good |
| 2000 | 6185 | 0.60 | 1856 | Bad | Bad | Bad | Good |
| 2050 | 6261 | 0.61 | 1878 | Bad | Good | Good | Good |
| 2100 | 6337 | 0.61 | 1901 | Bad | Good | Good | Good |

From the result of this test example 1, by forming the bottom of the support hole had the bulge, it was confirmed that the vortex was easily formed even if the rotation number is small, as compared with the case that the bottom of the support hole was flat. Accordingly, it was found that since the bottoms of the supporting holes each had the bulge such that liquid in the round-bottom vessels formed the vortex at the time of agitation of the liquid, the liquid in the plurality of vessels can be efficiently agitated.

Test Example 2

In the above-described test example 1, the holder and the support were formed of polyphenylene sulfide resin (PPS). In this test example 2, in order to determine the vortex formation in a case where other resin was used, the holder and the support formed of polyacetal resin (POM) were used for the test. Similar to the above-described test example 1, the round-bottom vessels tested were two types of tubes, namely 5 mL tubes formed of polystyrene (PS) and 5 mL tubes formed of polypropylene (PP). Also in this test example 2, in a case where it confirmed that the vortex was formed in clockwise and counterclockwise rotation, it was evaluated as "good". Otherwise, it was evaluated as "bad".

Note that, in this test example 2, the bulge of the bottom of the support hole had a cone shape and had a height of 0.02 mm. In addition, any vessel rack included the holder and the support formed of polyphenylene sulfide resin (PPS). In addition, any vessel rack had a through hole diameter of 14 mm and a support hole diameter of 13 mm.

TABLE 2

| Acceleration pulse (pulse) | Acceleration Frequency (Hz) | Rotation time (sec) | number (rpm) | Evaluation PPS Tube made of PS | Tube made of PP | POM Tube made of PS | Tube made of PP |
|---|---|---|---|---|---|---|---|
| 1800 | 5870 | 0.57 | 1761 | Bad | Bad | Bad | Bad |
| 1850 | 5950 | 0.57 | 1785 | Bad | Bad | Bad | Good |
| 1900 | 6029 | 0.58 | 1809 | Bad | Good | Bad | Good |
| 1950 | 6108 | 0.59 | 1832 | Bad | Good | Good | Good |
| 2000 | 6185 | 0.60 | 1856 | Bad | Good | Good | Good |
| 2050 | 6261 | 0.61 | 1878 | Good | Good | Good | Good |
| 2100 | 6337 | 0.61 | 1901 | Good | Good | Good | Good |

From the result of this test example 2, by forming the holder and the support formed of polyacetal resin (POM), it was confirmed that the vortex was easily formed even if the rotation number is small, as compared with the case that the holder and the support were formed of polyphenylene sulfide resin (PPS). Accordingly, it was found that since the holder and the support were formed of polyacetal resin (POM), the liquid in the plurality of vessels can be more efficiently agitated.

Test Example 3

In this test example 3, it determined whether or not a relationship between the through hole diameter and the support hole diameter affected the vortex formation. The round-bottom vessels tested were 5 mL tubes formed of polystyrene (PS). In this test example 3, more specifically, the total pulse of agitation was set to 25000 pulses, each vessel rack was rotated clockwise and counterclockwise, and predetermined acceleration pulse, a frequency, an acceleration time, and a rotation number were determined, and the vortex formation was visually confirmed. Also in this text example 3, similar to the above-described test examples 1 and 2, in a case where it confirmed that the vortex was formed in clockwise and counterclockwise rotation, it was evaluated as "good". Otherwise, it was evaluated as "bad".

TABLE 3

| Through hole diameter (mm) | Support hole diameter (mm) | Evaluation |
|---|---|---|
| 13 | 13 | Bad |
| 13.5 | 13 | Good |
| 14 | 13 | Good |
| 14.5 | 13 | Good |

From the result of this test example 3, by forming the through hole diameter greater than the support hole diameter, it was confirmed that the vortex was easily formed, as compared with the case that the through hole diameter and the support hole diameter were the same. Accordingly, it was found that since the bottoms of the supporting holes each had the bulge such that liquid in the round-bottom vessels formed the vortex at the time of agitation of the liquid, the liquid in the plurality of vessels can be more efficiently agitated.

The present technology may also have the following structures.

(1) A vessel rack, at least including:
a holder having a plurality of through-holes into which round-bottom vessels each having a closed-bottom tube shape are inserted; and
a support having a plurality of supporting holes that are arranged facing to the through-holes and support bottoms of the round-bottom vessels,
the bottoms of the supporting holes each having a bulge such that liquid in the round-bottom vessels forms a vortex at a time of agitation of the liquid.
(2) The vessel rack according to (1), in which
a diameter of each of the through-holes is greater than a diameter of each of the supporting holes.
(3) The vessel rack according to (1) or (2), in which
the bottoms of the supporting holes each has any of a cone shape, a substantially semispherical shape, and a cylindrical shape.
(4) The vessel rack according to any one of (1) to (3), in which
a height of the bulge is 0.02 mm or less.
(5) The vessel rack according to any one of (1) to (4), in which
the holder and/or the support is formed of resin.
(6) The vessel rack according to (5), in which
the resin is polyacetal resin or polyphenylene sulfide resin.
(7) The vessel rack according to any one of (1) to (6), in which
at least one supporting hole of the supporting holes positioned at corners of the support is communicated with outside on a part of a side wall of the supporting hole.
(8) An agitator of agitating liquid in a round-bottom vessel, at least including:
a vessel rack, at least including
a holder having a plurality of through-holes into which round-bottom vessels each having a closed-bottom tube shape are inserted, and
a support having a plurality of supporting holes that are arranged facing to the through-holes and support bottoms of the round-bottom vessels, the bottoms of the supporting holes each having a bulge such that liquid in the round-bottom vessels forms a vortex at a time of agitation of the liquid;
a mounting unit that mounts the vessel rack; and
a rocking unit that rocks the mounting unit.

(9) The agitator according to (8), in which
the rocking unit at least includes a first moving mechanism that moves the mounting unit in one predetermined axis direction, and a second moving mechanism that moves the mounting unit in a direction perpendicular to the one predetermined axis direction.

(10) The agitator according to (9), in which
the second moving mechanism is attached to the first moving mechanism.

(11) A fine particle measurement apparatus, at least including:
an agitator of agitating liquid in a round-bottom vessel, at least including
a vessel rack, at least including
a holder having a plurality of through-holes into which round-bottom vessels each having a closed-bottom tube shape are inserted, and
a support having a plurality of supporting holes that are arranged facing to the through-holes and support bottoms of the round-bottom vessels,
the bottoms of the supporting holes each having a bulge such that liquid in the round-bottom vessels forms a vortex at a time of agitation of the liquid,
a mounting unit that mounts the vessel rack, and
a rocking unit that rocks the mounting unit; and
a detector that detects light generated from fine particles to be analyzed.

(12) The fine particle measurement apparatus according to (11), in which
the rocking unit at least includes a first moving mechanism that moves the mounting unit in one predetermined axis direction, and a second moving mechanism that moves the mounting unit in a direction perpendicular to the one predetermined axis direction.

(13) The fine particle measurement apparatus according to (12), in which
the second moving mechanism is attached to the first moving mechanism.

(14) The fine particle measurement apparatus according to any of (11) to (13), further including:
a sampler that automatically samples the liquid in the round-bottom vessel.

(15) The fine particle measurement apparatus according to (14), in which
the mounting unit is moved to a predetermined position at a time of sampling by the sampler.

REFERENCE SIGNS LIST 1 vessel rack
11 holder
111 through hole
12 support
121 support hole
2 agitator
21 mounting unit
22 rocking unit
221 first moving mechanism
222 second moving mechanism
3 fine particle measurement apparatus
31 detector
32 sampler
33 information processing apparatus
34 light irradiator
35 dispenser
36 memory
P flow path
T substrate
37 display
38 user interface

The invention claimed is:
1. A vessel rack, comprising:
a holder having a plurality of through-holes, wherein
a plurality of round-bottom vessels is insertable into the plurality of through-holes, and
each round-bottom vessel of the plurality of round-bottom vessels has a closed bottom tube shape; and
a support having a plurality of supporting holes, wherein
the plurality of supporting holes faces the plurality of through-holes,
the plurality of supporting holes is configured to support bottoms of the plurality of round-bottom vessels,
at least one supporting hole of the plurality of supporting holes is at a corner of the support,
a first part of a side wall of the at least one supporting hole includes a first opening,
a second part of the side wall of the at least one supporting hole includes a second opening,
the at least one supporting hole communicates with an outside of the vessel rack via each of the first opening and the second opening,
the first opening of the at least one supporting hole is on a first side of the support,
the second opening of the at least one supporting hole is on a second side of the support,
the first side of the support is different from the second side of the support, and
a center portion of a bottom of each supporting hole of the plurality of supporting holes protrudes towards a direction of the plurality of through-holes.

2. The vessel rack according to claim 1, wherein a diameter of each through-hole of the plurality of through-holes is greater than a diameter of each supporting hole of the plurality of supporting holes.

3. The vessel rack according to claim 1, wherein the bottom of each supporting hole of the plurality of supporting holes has one of a cone shape, a substantially semispherical shape, or a cylindrical shape.

4. The vessel rack according to claim 1, wherein at least one of the holder or the support includes resin.

5. The vessel rack according to claim 4, wherein the resin is one of polyacetal resin or polyphenylene sulfide resin.

6. An agitator, comprising:
a vessel rack including:
a holder having a plurality of through-holes, wherein
a plurality of round-bottom vessels is insertable into the plurality of through-holes,
each round-bottom vessel of the plurality of round-bottom vessels has a closed bottom tube shape, and
the agitator is configured to agitate liquid in each round-bottom vessel of the plurality of round-bottom vessels; and
a support having a plurality of supporting holes, wherein
the plurality of supporting holes faces the plurality of through-holes, the plurality of supporting holes is configured to support bottoms of the plurality of round-bottom vessels, at least one supporting hole of the plurality of supporting holes is at a corner of the support, a first part of a side wall of the at least one supporting hole includes a first opening, a second part of the side wall of the at least one supporting hole includes a second opening, the at least one supporting hole communicates with an outside of the vessel rack via each of the first opening and the second opening, the first opening of the at least one supporting hole is on a first side of the support, the second opening of the at least one supporting hole is on a second side of the support, the first side of the support is different from the second side of the support, and a center portion of a bottom of each supporting hole of the plurality of supporting holes protrudes towards a direction of the plurality of through-holes;

a mounting unit configured to mount the vessel rack; and a rocking unit configured to rock the mounting unit.

7. The agitator according to claim 6, wherein the rocking unit includes:

a first moving mechanism configured to move the mounting unit in a first axis direction; and a second moving mechanism configured to move the mounting unit in a second axis direction perpendicular to the first axis direction.

8. The agitator according to claim 7, wherein the second moving mechanism is attached to the first moving mechanism.

9. A fine particle measurement apparatus, comprising:

an agitator configured to agitate liquid in each round-bottom vessel of a plurality of round-bottom vessels, wherein the agitator includes:

a vessel rack including:

a holder having a plurality of through-holes, wherein the plurality of round-bottom vessels is insertable into the plurality of through-holes, and each round-bottom vessel of the plurality of round-bottom vessels has a closed bottom tube shape; and a support having a plurality of supporting holes, wherein the plurality of supporting holes faces the plurality of through-holes, the plurality of supporting holes is configured to support bottoms of the plurality of round-bottom vessels, at least one supporting hole of the plurality of supporting holes is at a corner of the support, a first part of a side wall of the at least one supporting hole includes a first opening, a second part of the side wall of the at least one supporting hole includes a second opening, the at least one supporting hole communicates with an outside of the vessel rack via each of the first opening and the second opening, the first opening of the at least one supporting hole is on a first side of the support, the second opening of the at least one supporting hole is on a second side of the support, the first side of the support is different from the second side of the support, a center portion of a bottom of each supporting hole of the plurality of supporting holes protrudes towards a direction of the plurality of through-holes, and the liquid comprises fine particles;

a mounting unit configured to mount the vessel rack; and a rocking unit configured to rock the mounting unit; and a detector configured to detect light generated from the fine particles.

10. The fine particle measurement apparatus according to claim 9, wherein the rocking unit includes:

a first moving mechanism configured to move the mounting unit in a first axis direction; and a second moving mechanism configured to move the mounting unit in a second axis direction perpendicular to the first axis direction.

11. The fine particle measurement apparatus according to claim 10, wherein the second moving mechanism is attached to the first moving mechanism.

12. The fine particle measurement apparatus according to claim 9, further comprising a sampler configured to execute a sampling operation on the liquid in each round-bottom vessel of the plurality of round-bottom vessels.

13. The fine particle measurement apparatus according to claim 12, wherein the mounting unit is configured to move to a specific position at a time of the execution of the sampling operation by the sampler.

* * * * *